United States Patent
Kodama

(10) Patent No.: US 8,305,855 B2
(45) Date of Patent: Nov. 6, 2012

(54) INFORMATION PROCESSING APPARATUS AND INFORMATION PROCESSING METHOD

(75) Inventor: Hidetaka Kodama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/156,683

(22) Filed: Jun. 9, 2011

(65) Prior Publication Data

US 2012/0051200 A1 Mar. 1, 2012

(30) Foreign Application Priority Data

Aug. 30, 2010 (JP) ................. 2010-192789

(51) Int. Cl.
*G11B 15/52* (2006.01)
(52) U.S. Cl. .................. 369/47.52; 369/53.27
(58) Field of Classification Search .......... None
See application file for complete search history.

(56) References Cited

U.S. PATENT DOCUMENTS

| 5,495,456 | A | * | 2/1996 | Oka et al. | 369/13.24 |
| 6,421,314 | B1 | | 7/2002 | Maruyama | |
| 2002/0163875 | A1 | * | 11/2002 | Tanaka | 369/116 |
| 2011/0026381 | A1 | * | 2/2011 | Nishimura et al. | 369/47.5 |

FOREIGN PATENT DOCUMENTS

JP 2000-149302 5/2000
JP 2004-288277 10/2004

* cited by examiner

*Primary Examiner* — Paul Huber
(74) *Attorney, Agent, or Firm* — Oblon, Spivak, McClelland, Maier & Neustadt, L.L.P.

(57) ABSTRACT

An information processing apparatus includes: a signal reproduction section configured to obtain a reproduced signal from a recording medium by radiating a laser beam emitted by a laser-beam source to the recording medium; and a high-frequency signal superposition section configured to superpose either a first high-frequency signal or a second high-frequency signal having a frequency higher than the frequency of the first high-frequency signal on a driving signal used for driving the laser-beam source, wherein, in a first signal reproduction operation, the high-frequency signal superposition section superposes the first high-frequency signal on the driving signal whereas, in a second signal reproduction operation to measure information on the amplitude of the reproduced signal, the high-frequency signal superposition section superposes the second high-frequency signal on the driving signal.

8 Claims, 3 Drawing Sheets

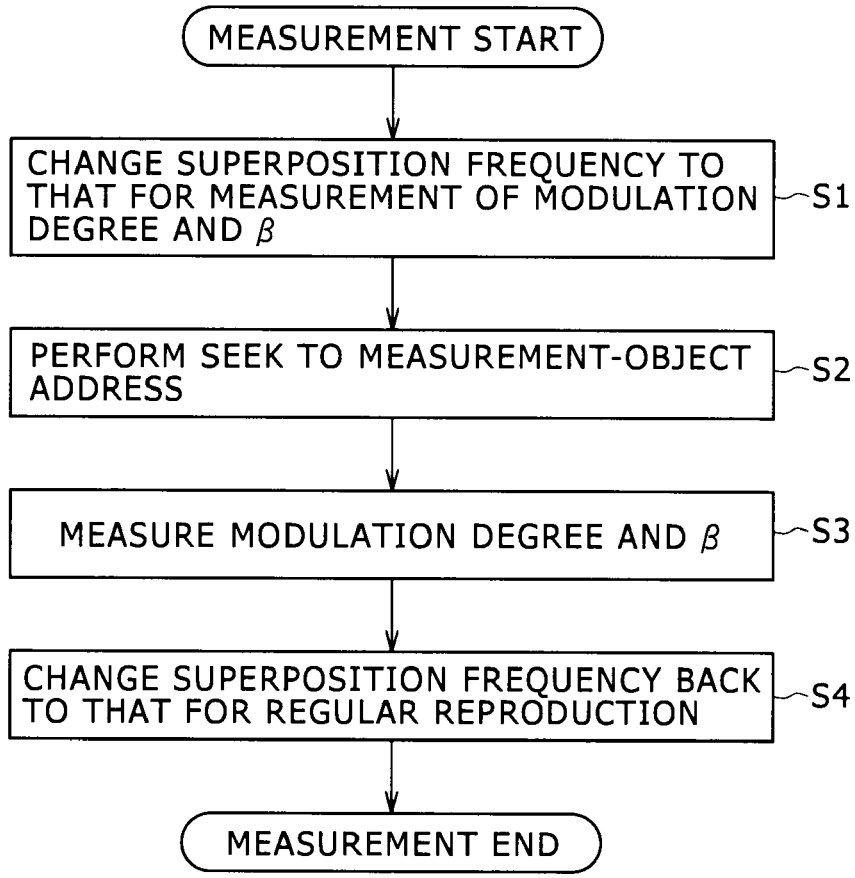
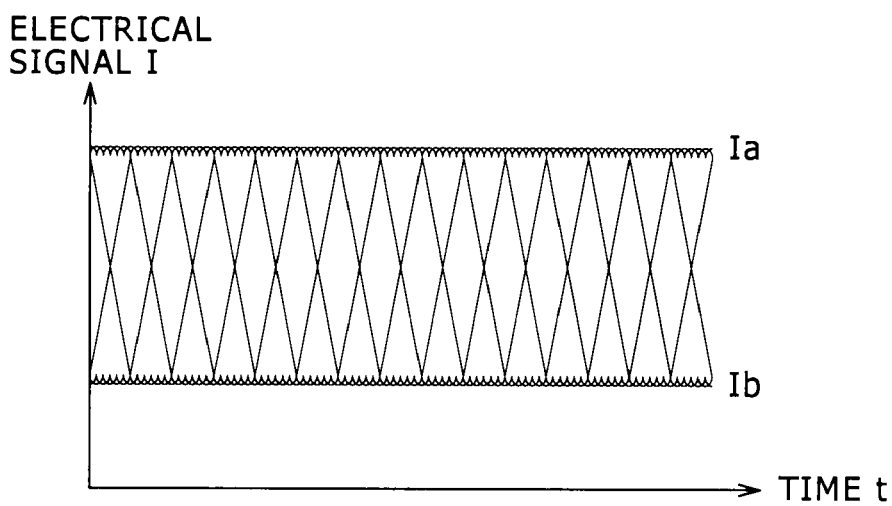

INFORMATION PROCESSING APPARATUS AND INFORMATION PROCESSING METHOD

BACKGROUND

The present disclosure relates to an information processing apparatus for controlling the frequency of a high-frequency signal superposed on a driving signal for driving a laser-beam source and an information processing method provided for the information processing apparatus.

The optical disc such as the DVD (Digital Versatile Disc) and the BD (Blu-ray Disc, a trademark) is widely used. In an operation to reproduce information from a desired position on the optical disc, a laser beam emitted by a laser-beam source is radiated to the desired position and a beam reflected from the position is detected. Then, the reflected beam is converted into an electrical signal in order to generate a reproduced signal also referred to as an RF (Radio Frequency) signal. At that time, a portion of the reflected beam is inadvertently returned to the laser-beam source. The portion of the reflected beam is referred to as a returned beam giving rise to noises of the laser beam. The noises raise a problem in the practical use.

In order to repress the noises caused by the returned beam, a high-frequency signal is superposed on a driving signal which is typically a driving current used for driving the laser-beam source. By superposing a high-frequency signal on the driving signal, it is possible to reduce a RIN (Relative Intensity Noise) which is a noise characteristic of a laser beam generated by the laser-beam source and to increase the S/N ratio (Signal to Noise ratio) of the RF signal reproduced from the optical disc. Such a technique is disclosed in documents such as Japanese Patent Laid-open Nos. 2000-149302 and 2004-288277.

In the optical-disc apparatus, on the other hand, OPC (Optimum Power Control) is executed as processing to adjust the recording power of the laser beam. In accordance with the OPC, in an OPC area provided typically in an innermost circumferential area on the optical disc, tentative data determined in advance is written and the written tentative data is reproduced in order to generate an RF signal. Then, envelope information obtained from the waveform of the RF signal is used to carry out processing determined in advance in order to obtain measurement values which include the modulation degree of the RF signal, a β value and the amplitude of the RF signal. The β value shows the asymmetricity of the amplitude of the RF signal. In the following description, the amplitude of the RF signal is also referred to simply as an RF amplitude. Then, on the basis of these measurement values, a proper recording power of the laser beam is determined. In the following description, the modulation degree, the β value and the RF amplitude are also referred to as a modulation degree which is a generic technical term used to represent the modulation degree, the β value and the RF amplitude. The modulation degree is measured not only during the OPC, but also during a process of adjusting the optical aberration in a signal reproduction operation.

SUMMARY

By the way, an RF signal reproduced in a regular signal reproduction operation is generally processed as an AC (Alternating Current) signal. Thus, the DC (Direct Current) component is removed from the RF signal. On the other hand, in a process of measuring a modulation degree for example, the DC component is required in some cases. Thus, during the process of measuring a modulation degree, the DC component is not eliminated in some cases. In addition, in many cases, the frequency band required for an RF signal reproduced in a regular signal reproduction operation is different from the frequency band required for an RF signal reproduced in the process of measuring a modulation degree. Such a difference gives rise to an error in the process of measuring a modulation degree at which a high-frequency signal component superposed on a driving signal is modulated. It is thus feared that an accurate measurement value cannot be obtained.

In addition, the RF signal obtained through an optical pickup includes high-frequency signal components of the high-frequency signal. A system for carrying out the regular signal reproduction operation is provided with an equalizer circuit having typically a high-order FIR (Finite Impulse Response) filter serving as a low-pass filter for eliminating the high-frequency signal components. In this way, the high-frequency signal components included in the RF signal can be removed sufficiently. In many cases, however, a system for measuring the modulation degree is configured to employ a primary CR analog low-pass filter in place of a high-order FIR filter. It is thus impossible to eliminate the high-frequency signal components from the RF signal sufficiently and rigorously.

In the case of a double-speed reproduction operation particularly, the frequency band of the RF signal is spread so that the highest frequency of the RF signal approaches the frequency of a high-frequency signal component. In this case, it is difficult to eliminate only the high-frequency signal components from the RF signal by making use of the primary CR analog low-pass filter in order to obtain the RF signal. If the process of measuring a modulation degree and other measurement values is carried out on the basis of an RF signal including high-frequency signal components, it is impossible to obtain an accurate modulation degree and other accurate measurement values due to errors caused by the high-frequency signal components. It is to be noted that a high-order FIR filter provided for a system for measuring a modulation degree and other measurement values makes the information processing apparatus complicated and, hence, raises a problem in the cost aspect.

As conceivable solutions to the problems raised in the process of measuring a modulation degree and other measurement values, it is possible to superpose no high-frequency signal on the driving signal or reduce the amplitude of the high-frequency signal. If no high-frequency signal is superposed on the driving signal, however, unexpected noises are generated due to interferences between the radiated laser beam and the returned laser beam. It is thus feared that the processing of apparatus sections such as a tracking servo, a focus servo and an address decoder goes wrong.

It is thus desirable to present an information processing apparatus capable of obtaining accurate measurement values such as the modulation degree and present an information processing method for the information processing apparatus.

In order to solve the problems described above, there is provided an information processing apparatus according to an embodiment of the present disclosure. The information processing apparatus employs:

a signal reproduction section configured to obtain a reproduced signal from a recording medium by radiating a laser beam emitted by a laser-beam source to the recording medium; and a high-frequency signal superposition section configured to superpose either a first high-frequency signal or a second high-frequency signal having a frequency higher than the frequency of the first high-frequency signal on a driving signal used for driving the laser-beam source.

In a first signal reproduction operation, the high-frequency signal superposition section superposes the first high-frequency signal on the driving signal whereas, in a second signal reproduction operation to measure information on the amplitude of the reproduced signal, the high-frequency signal superposition section superposes the second high-frequency signal on the driving signal.

In addition, there is also provided an information processing method according to another embodiment of the present disclosure. The information processing method has:

a signal reproduction step of obtaining a reproduced signal from a recording medium by radiating a laser beam emitted by a laser-beam source to the recording medium; and a high-frequency signal superposition step of superposing either a first high-frequency signal or a second high-frequency signal having a frequency higher than the frequency of the first high-frequency signal on a driving signal used for driving the laser-beam source.

In a first signal reproduction operation, the high-frequency signal superposition step is carried out in order to superpose the first high-frequency signal on the driving signal whereas, in a second signal reproduction operation to measure information on the amplitude of the reproduced signal, on the other hand, the high-frequency signal superposition step is carried out in order to superpose the second high-frequency signal on the driving signal.

In accordance with at least one embodiment, accurate information on the amplitude of the RF signal can be obtained. Thus, measurement values measured by making use of the information on the amplitude are also accurate. The measurement values include the modulation degree.

BRIEF DESCRIPTION OF THE DRAWINGS

FIG. 2 shows a flowchart showing the flow of processing carried out by the information processing apparatus according to the embodiment;

FIG. 3 is a diagram showing the waveform of an ideal RF signal;

DETAILED DESCRIPTION OF THE PREFERRED EMBODIMENT

Figure 1:
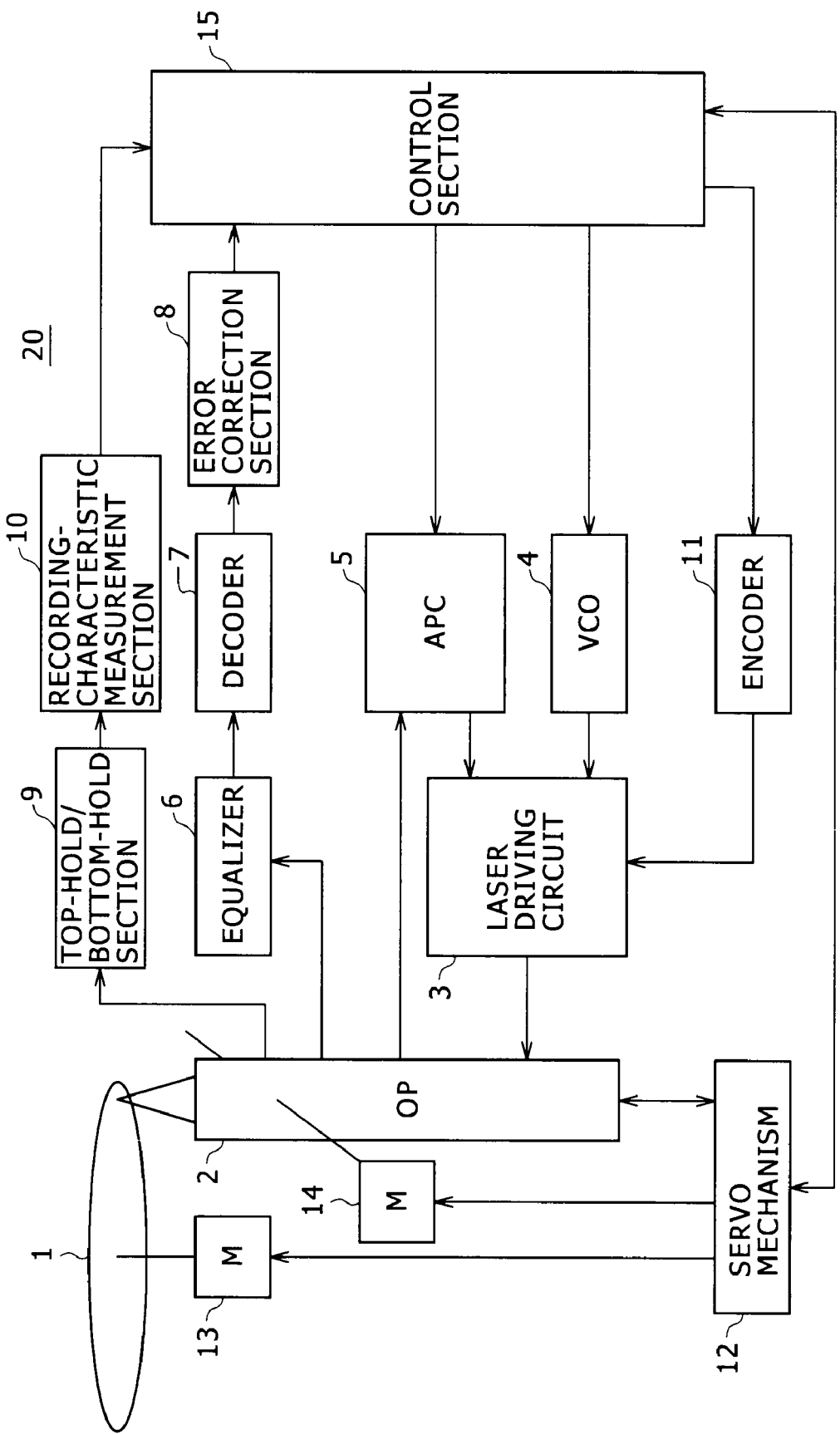
FIG. 1 is a block diagram showing the configuration of an information processing apparatus according to an embodiment.

By referring to diagrams, implementations of the present disclosure are explained in chapters arranged in the following order:
Embodiment
Modifications It is to be noted that an embodiment and each modification which are explained in the following description are preferred typical implementations having a variety of desirable technological limitations. However, unless otherwise clearly specified in the following description, the limitations by no means limit the embodiment and each of the modifications.
Embodiment
1. Configuration of the Information Processing Apparatus FIG. 1 is a block diagram showing the configuration of an information processing apparatus 20 according to an embodiment. The information processing apparatus 20 has functions to record a signal onto an optical disc 1 and reproduce a recorded signal from the optical disc 1. The information processing apparatus 20 employs an OP (Optical Pickup) 2, a laser driving circuit 3, a VCO (Voltage Controlled Oscillator) 4 and an APC (Automatic Power Control) 5. In addition, the information processing apparatus 20 also includes a signal reproduction system, a signal recording system, an information measurement system and a servo system. Used for carrying out regular signal reproduction operations, the signal reproduction system has an equalizer 6, a decoder 7 and an error correction section 8 whereas the signal recording system has an encoder 11. On the other hand, the information measurement system has a top-hold/bottom-hold section 9 and a recording-characteristic measurement section 10 whereas the servo system has a servo mechanism 12, a spindle motor 13 and a thread motor 14. The sections composing the information processing apparatus 20 are controlled typically by a control section 15.

The optical disc 1 is a recordable disc such as a DVD-R (Recordable) and a BD-R (Recordable). The spindle motor 13 rotates a turntable, on which the optical disc 1 is mounted, at a rotation speed determined in advance. The turntable itself is not shown in the figure.

The optical pickup 2 is configured to employ a laser-beam source, an optical system and a light detector. The laser-beam source generates a laser beam for signal recording and reproduction operations. The optical system converges a laser beam, which is emitted by the laser-beam source, on the recording surface of the optical disc 1 through an object lens and takes a beam reflected by the optical disc 1. The light detector detects the reflected beam taken by the optical system.

In addition, a laser-beam position adjustment mechanism implemented by a magnetic actuator is mounted inside the optical pickup 2. The magnetic actuator controls the object lens to move the object lens in the focus and tracking directions.

The laser-beam source employed in the optical pickup 2 is driven by a driving current generated by the laser driving circuit 3 as a driving signal for driving the laser-beam source. The VCO 4 supplies a high-frequency signal to the laser driving circuit 3. In a signal reproduction operation carried out on the optical disc 1 for example, the VCO 4 generates the high-frequency signal by oscillation in accordance with control executed by the control section 15. Then, the VCO 4 supplies the generated high-frequency signal to the laser driving circuit 3. The frequency of the high-frequency signal generated by the VCO 4 by oscillation can be changed in accordance with the control executed by the control section 15.

The laser driving circuit 3 superposes the high-frequency signal received from the VCO 4 on the driving signal used for driving the laser-beam source. The laser driving circuit 3 then supplies the driving signal with the high-frequency signal superposed thereon to the laser-beam source provided inside the optical pickup 2. Receiving such a driving signal, the laser-beam source emits a laser beam according to the driving signal. In this way, the laser driving circuit 3 functions as a high-frequency signal superposition section. It is to be noted that the laser driving circuit 3 superposes the high-frequency signal on the driving signal not only during a process of reproducing a signal from the optical disc 1, but also a process of recording a signal onto the optical disc 1.

The APC 5 monitors the laser power of a laser beam emitted by the laser-beam source and controls the laser driving circuit 3 in order to set the emission strength of the laser beam at a desired level.

In a regular signal reproduction operation carried out on the optical disc 1, a laser beam is radiated to the optical disc 1 and a light detector converts a beam reflected by the optical disc 1 into an electrical signal. The optical pickup 2 supplies the electrical signal to an analog front end not shown in the figure. Typically, the optical pickup 2 and the analog front end not shown in the figure form a signal reproduction section. The analog front end generates reproduced data including the RF signal, a focus error signal, a tracking error signal and a wobble signal.

The analog front end supplies the RF signal to the equalizer 6. The equalizer 6 typically includes a high-order FIR filter as a low pass filter. Not shown in the figure, the high-order FIR filter is a digital filter. The equalizer 6 reshapes the RF signal and the high-order FIR filter of the equalizer 6 removes high-frequency signal components of the high-frequency signal from the RF signal. The treble cutoff characteristic of the high-order FIR filter employed in the equalizer 6 is steeper than the treble cutoff characteristic of a primary CR analog low-pass filter employed in the top-hold/bottom-hold section 9 to be described later. By making use of the high-order FIR filter employed in the equalizer 6, it is possible to rigorously remove high-frequency signal components of the high-frequency signal from the RF signal.

The equalizer 6 carries out predetermined signal processing such as a binary conversion process on the RF signal. After being subjected to the predetermined signal processing carried out by the equalizer 6, the RF signal is supplied to the decoder 7 for carrying out decode processing on the RF signal. After being subjected to the decode processing carried out by the decoder 7, the RF signal is supplied to the error correction section 8. The error correction section 8 carries out error correction processing on the RF signal in order to generate a reproduced signal. The error correction section 8 supplies the reproduced signal to the control section 15. The regular signal reproduction operation described above is an example of the first signal reproduction operation.

The control section 15 is typically configured to employ a DSP (Digital Signal Processor) having a memory. The control section 15 controls the sections composing the information processing apparatus 20. In addition, the control section 15 supplies the reproduced signal received from the error correction section 8 to an external signal recipient provided outside the information processing apparatus 20 by way of an interface not shown in the figure.

The analog front end generates a focus error signal, a tracking error signal and a wobble signal, supplying these signals to the control section 15. The control section 15 carries out its address decoding function in order to decode the wobble signal received from the analog front end and generates information on an address on the optical disc 1 as a result of the decode processing.

In addition, the control section 15 also generates a focus drive signal, which is used for focus control, from the focus error signal received from the analog front end. On top of that, the control section 15 also generates a tracking drive signal, which is used for tracking control, from the tracking error signal received from the analog front end. In addition, the control section 15 also generates a thread motor signal used for driving the thread motor 14 for moving the optical pickup 2 to a target position. The control section 15 supplies the focus drive signal, the tracking drive signal and the thread motor signal to the servo mechanism 12.

The servo mechanism 12 drives the thread motor 14 in accordance with the focus drive signal, the tracking drive signal and the thread motor signal which have been received from the control section 15. Driven by the servo mechanism 12, the thread motor 14 moves the optical pickup 2 in an operation to seek for a desired position on the optical disc 1. Then, a laser beam is radiated to the desired position.

In an operation to record a signal onto the optical disc 1, data to be recorded is supplied to the encoder 11. The data to be recorded has been subjected to processing including a process to add error correction codes to the data. The encoder 11 modulates the laser beam by making use of the data to be recorded in order to generate information on emission of the laser beam and supplies the emission information to the laser driving circuit 3.

The laser driving circuit 3 generates a driving signal in accordance with the emission information received from the encoder 11 and supplies the driving signal to the light-beam source employed in the optical pickup 2. The light-beam source emits a light beam according to the driving signal and radiates the emitted laser beam to the optical disc 1 in order to record the data to be recorded on the optical disc 1. In the information processing apparatus 20 according to the embodiment, the optical pickup 2 thus functions as a typical data recording section.

The information processing apparatus 20 having the configuration described above carries out the so-called OPC (Optimum Power Control) which is processing to adjust the recording power of a laser beam or the recording pulse of the beam. Typically, the OPC is carried out prior to the operation to record data to be recorded on the optical disc 1. During the execution of the OPC, in an OPC area provided typically in an innermost circumferential area on the optical disc 1, data determined in advance is written by making use of the optical pickup 2. Then, a laser beam emitted from the optical pickup 2 is radiated to the OPC area in order to read out the data, which has been written in the OPC area, through the optical pickup 2. The data is read out as a reproduced RF signal. This operation to reproduce the RF signal at the OPC time is an example of the second signal reproduction operation. The RF signal is supplied to the top-hold/bottom-hold section 9.

From the RF signal received from the optical pickup 2, the top-hold/bottom-hold section 9 measures a modulation degree and information on the amplitude of the RF signal. This information is required in a measurement of a β value. A typical example of the information on the amplitude of the RF signal is information on the envelope of the RF signal. The top-hold/bottom-hold section 9 measures the levels of the top (or the peak) of the amplitude of the RF signal and the bottom of the amplitude. The top-hold/bottom-hold section 9 is typically provided with a primary CR analog filter not shown in the figure.

It is to be noted that the top-hold/bottom-hold section 9 can also be configured into a configuration in which the DC component is eliminated from the RF signal in accordance with the measurement objects such as the modulation degree and the β value. For example, the DC component of the RF signal is generally required in the measurement of the modulation degree whereas the β value is generally defined for an RF signal not including a DC component. Thus, in accordance with the measurement objects, the top-hold/bottom-hold section 9 may carry out processing to remove the DC component from the RF signal received from the optical pickup 2. The top-hold/bottom-hold section 9 supplies the envelop information detected thereby to the recording-characteristic measurement section 10.

By making use of the envelope information received from the top-hold/bottom-hold section 9, the recording-characteristic measurement section 10 carries out processing determined in advance to compute measurement values such as the modulation degree, the β value and the RF amplitude. Then, the recording-characteristic measurement section 10 supplies the measurement values computed thereby to the control section 15.

The control section 15 generates a control signal for optimizing the recording power of the laser beam in accordance with the measurement values received from the recording-characteristic measurement section 10 and supplies the control signal to the APC 5. The APC 5 drives the laser driving circuit 3 in accordance with the control signal received from the control section 15. In this way, by carrying out the OPC in a recording operation, the recording power of the laser beam emitted in the recording operation can be optimized.

As described above, in a regular signal reproduction operation, an RF signal output by the optical pickup 2 is supplied to the signal reproduction system employing the equalizer 6, the decoder 7 and the error correction section 8. In a signal reproduction operation to measure information on the amplitude of the RF signal, on the other hand, an RF signal output by the optical pickup 2 is supplied to the information measurement system employing the top-hold/bottom-hold section 9 and the recording-characteristic measurement section 10. Typically, the control section 15 controls the switching of the system receiving the RF signal from the signal reproduction system to the information measurement system and vice versa.

By the way, in accordance with the related-art technology, when tentative data written into the OPC area is reproduced, a high-frequency signal similar to that used in the regular signal reproduction operation is superposed on a driving signal. It is thus feared that high-frequency signal components of the high-frequency signal give rise to errors in the measurement of measurement values such as the modulation degree and the β value.

The primary CR analog filter employed in the top-hold/bottom-hold section 9 is not capable of removing the high-frequency signal components of the high-frequency signal from the RF signal sufficiently and rigorously. Thus, the high-frequency signal components of the high-frequency signal remain in the RF signal. The high-frequency signal components of the high-frequency signal remaining in the RF signal affect the information on the envelope of the RF signal. Due to the effects of the high-frequency signal components of the high-frequency signal, the top-hold/bottom-hold section 9 is not capable of obtaining accurate information on the envelope so that errors are generated in the modulation degree and the β value which are computed by the recording-characteristic measurement section 10.

Thus, in order to solve the problems described above, in a signal reproduction operation to measure the information on the envelope of the RF signal, the information processing apparatus 20 according to the embodiment increases the frequency of the high-frequency signal superposed on the driving signal. That is to say, in an OCP signal reproduction operation, the control section 15 controls the VCO 4 to increase the frequency of the high-frequency signal generated by the VCO 4 to a value higher than the frequency of the high-frequency signal generated by the VCO 4 in a regular signal reproduction operation. Typically, in accordance with a control signal supplied to the VCO 4 from the control section 15, the setting of the VCO 4 is modified to change the frequency of the high-frequency signal to a higher value.

By oscillation, the VCO 4 generates the high-frequency signal with an increased frequency and supplies the high-frequency signal to the laser driving circuit 3. The laser driving circuit 3 superposes the high-frequency signal with an increased frequency on a driving signal. The laser driving circuit 3 supplies the driving signal with the high-frequency signal superposed thereon to the laser-beam source provided inside the optical pickup 2 in order to drive the laser-beam source. As a result, laser-beam source emits a laser beam.

The laser beam emitted by the laser-beam source is radiated to the OPC area on the optical disc 1. A beam reflected by the optical disc 1 is converted into an electrical signal which is a reproduced RF signal. The RF signal is supplied to the top-hold/bottom-hold section 9. As described above, in an OCP signal reproduction operation, the VCO 4 increases the frequency of the high-frequency signal superposed on the driving signal to a value higher than the frequency of the high-frequency signal generated by the VCO 4 in a regular signal reproduction operation. Thus, the primary CR analog filter employed in the top-hold/bottom-hold section 9 is capable of removing the high-frequency signal components of the high-frequency signal from the RF signal sufficiently and rigorously. It is thus possible to prevent the high-frequency signal components of the high-frequency signal from remaining in the RF signal.

Since it is possible to prevent the high-frequency signal components of the high-frequency signal from being left in the RF signal, the top-hold/bottom-hold section 9 is capable of measuring the information on the envelope with a high degree of accuracy. Thus, the measurement values computed by the recording-characteristic measurement section 10 on the basis of the envelope information measured by the top-hold/bottom-hold section 9 are also accurate as well. As described earlier, the measurement values include the modulation degree.

2. OPC Processing

FIG. 2 shows a flowchart showing the flow of OPC processing carried out by the information processing apparatus 20. It is to be noted that, to be more specific, in the processing described below, the process is carried out before tentative data is written into the OPC area on the optical disc 1 and the tentative data written on the OPC area is reproduced.

The flowchart shown in the figure begins with a step S1 at which the control section 15 controls the VCO 4 to change the frequency of the high-frequency signal to be superposed on the driving signal from fr to fm. In the following description, the frequency of the high-frequency signal is referred to simply as a superposition frequency. Reference symbol fr denotes a regular superposition frequency for the regular signal reproduction operation whereas reference symbol fm denotes an OPC superposition frequency for the OPC signal reproduction operation. The OPC superposition frequency fm is a frequency proper for an operation to measure the information on the envelope of the RF signal and an operation to measure measurement values such as the modulation degree and the β value on the basis of the information on the envelope. Typically, with the treble cutoff frequency fc of the primary CR analog filter equivalently employed in the top-hold/bottom-hold section 9 taken as a reference value, the OPC superposition frequency fm is set at a sufficiently high value. It is desirable to set the OPC superposition frequency fm at a value equal to 2 to 4 times the treble cutoff frequency fc.

For example, if the treble cutoff frequency fc of the primary CR analog filter is 130 MHz, the OPC superposition frequency fm is set at a value close to 500 MHz which is about 4 times the treble cutoff frequency fc of 130 MHz. It is to be noted that, if the transmission loss characteristic between the optical pickup 2 and the top-hold/bottom-hold section 9 can be grasped, the superposition frequency can be determined on the basis of the transmission loss characteristic. After the superposition frequency has been changed from fr to fm, the flow of the processing goes on to a step S2.

At the step S2, the control section 15 controls the servo mechanism 12 to drive the thread motor 14. The thread motor 14 is driven to move the optical pickup 2 to a position indicated by an address serving as the object of measurement in the OPC area on the optical disc 1 and to radiate a laser beam to the position from the optical pickup 2 as explained in the following description.

Then, by oscillation, the VCO 4 generates a high-frequency signal having the OPC superposition frequency fm and supplies the high-frequency signal having the OPC superposition frequency fm to the laser driving circuit 3. The laser driving circuit 3 superposes the high-frequency signal having the OPC superposition frequency fm on the driving signal and supplies the driving signal with the high-frequency signal superposed thereon to the laser beam source. The laser beam source emits a laser beam in accordance with the driving signal and radiates the laser beam to the OPC area as described above.

The laser beam radiated to the OPC area on the optical disc 1 is reflected and converted into an electrical signal which is a reproduced RF signal. The RF signal is supplied to the top-hold/bottom-hold section 9. The primary CR analog filter employed in the top-hold/bottom-hold section 9 carries out a filtering process of removing the high-frequency signal components of the high-frequency signal from the RF signal. As described above, the OPC superposition frequency fm has been set at a value sufficiently higher than the treble cutoff frequency fc of the primary CR analog filter. Therefore, the high-frequency signal components of the high-frequency signal can be removed by the primary CR analog filter. Thus, the primary CR analog filter is capable of preventing the high-frequency signal components of the high-frequency signal from remaining in the RF signal.

The top-hold/bottom-hold section 9 detects information on the envelope of the RF signal. For example, the top-hold/bottom-hold section 9 measures the levels of the top (or the peak) of the amplitude of the RF signal and the bottom of the amplitude. As described above, by carrying out the filtering process, the primary CR analog filter is capable of preventing the high-frequency signal components of the high-frequency signal from remaining in the RF signal. Thus, the top-hold/bottom-hold section 9 is capable of measuring the information on the envelope of the RF signal with a high degree of accuracy. The top-hold/bottom-hold section 9 supplies the detected information on the envelope of the RF signal to the recording-characteristic measurement section 10. Then, the flow of the processing goes on to a step S3.

At the step S3, by making use the envelope information received from the top-hold/bottom-hold section 9, the recording-characteristic measurement section 10 carries out processing determined in advance. By carrying out the processing determined in advance, the recording-characteristic measurement section 10 is capable of computing measurement values such as the modulation degree. Since the information on the envelope of the RF signal can be measured with a high degree of accuracy, the measurement values (such as the modulation degree) measured by the recording-characteristic measurement section 10 in the predetermined processing making use of the information on the envelope of the RF signal are also accurate as well. The recording-characteristic measurement section 10 supplies the measurement values measured thereby to the control section 15.

The control section 15 generates a control signal used for optimizing the recording power of the laser beam on the basis of the measurement values received from the recording-characteristic measurement section 10. The control section 15 then supplies the control signal to the APC 5. On the basis of the control signal received from the control section 15, the APC 5 drives the laser driving circuit 3. In this way, the recording power of the laser beam is optimized and the OPC is terminated. Then, the flow of the processing goes on to a step S4.

At the step S4, since the OPC has been completed, the OPC superposition frequency fm for the OPC signal reproduction operation is changed back to the regular superposition frequency fr for the regular signal reproduction operation. For example, the control section 15 carries out control to modify the setting of the VCO 4 in order to change the OPC superposition frequency fm for the OPC signal reproduction operation back to the regular superposition frequency fr for the regular signal reproduction operation. The regular superposition frequency fr is set at a value proper for the regular signal reproduction system including the equalizer 6, the decoder 7 and the error correction section 8 which are used for carrying out the regular signal reproduction on the RF signal. For example, the regular superposition frequency fr is set at a typical value of close to 300 MHz. It is to be noted that, in the processing described above, the superposition frequency can also be changed after the optical pickup 2 has been moved to a position included in the OPC area as a position to which the laser beam is to be radiated.

3. Effects

Figure 4:
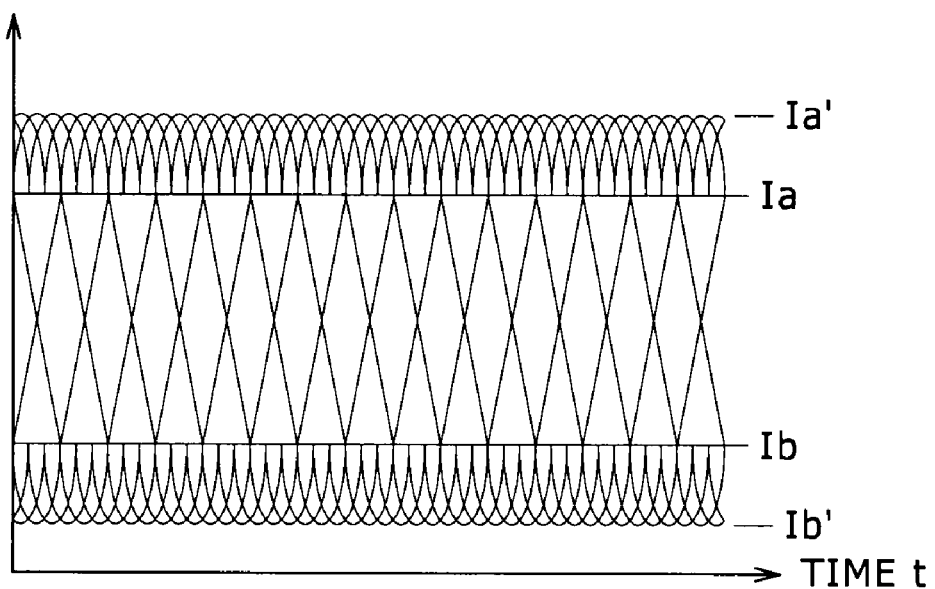
FIG. 4 is a diagram showing the waveform of an RF signal affected by high-frequency signal components.
Figure 5:
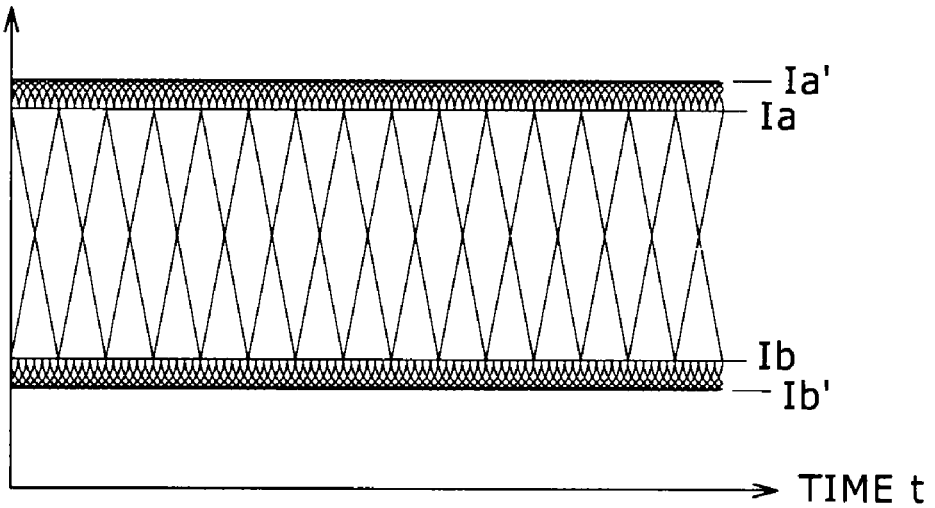
FIG. 5 is a diagram showing the waveform of an RF signal less affected by high-frequency signal components.

Next, effects of the present disclosure are explained by referring to FIGS. 3, 4 and 5. FIG. 3 is a diagram showing the waveform of a model of an ideal RF signal supplied by the optical pickup 2 to the top-hold/bottom-hold section 9.

The RF signal shown in FIG. 3 is typically a current obtained by converting information read out by the optical pickup 2 from the optical disc 1. Reference symbols Ia and Ib shown in FIG. 3 denote information on the envelope of the RF signal. The information on the envelope of the RF signal is measured by the top-hold/bottom-hold section 9.

The recording-characteristic measurement section 10 carries out processing by making use of the envelope information measured by the top-hold/bottom-hold section 9 in order to compute the modulation degree M, the β value and the RF amplitude. For example, the modulation degree M is computed in accordance with Eq. (1) given as follows:

$$M=(Ia-Ib)/Ia \quad (1)$$

In addition, the β value is generally defined for an RF signal not including the DC component. For the sake of convenience, however, the β value is defined by Eq. (2) based on the pieces of envelope information Ia and Ib as follows:

$$p=(Ia+Ib)/(Ia-Ib) \quad (2)$$

In addition, the amplitude of the RF signal is generally defined for a case in which the DC component is included and a case in which the DC component is not included. For the sake of convenience, however, the RF amplitude which is the amplitude of the RF signal is defined by Eq. (3) based on the pieces of envelope information Ia and Ib as follows:

$$\text{RF amplitude}=(Ia-Ib) \quad (3)$$

Next, by referring to FIG. 4, the following description explains a case in which the process of increasing the superposition frequency is not carried out in the OPC signal reproduction operation. Since the process of increasing the superposition frequency is not carried out, the primary CR analog filter employed in the top-hold/bottom-hold section 9 is not capable of removing high-frequency signal components from the RF signal so that the high-frequency signal components are left in the RF signal. FIG. 4 is a diagram showing the waveform of a model of an RF signal affected by high-frequency signal components.

If high-frequency signal components are left in the RF signal, as shown in FIG. 4, the pieces of envelop information Ia' and Ib' of the RF signal include errors caused by the high-frequency signal components. Thus, if the modulation degree M is computed in accordance with Eq. (1) making use of the pieces of envelop information Ia' and Ib', an accurate modulation degree M cannot be obtained. By the same token, if the $\beta$ value is computed in accordance with Eq. (2) making use of the pieces of envelop information Ia' and Ib', an accurate $\beta$ value cannot be obtained. In the same way, if the RF amplitude is computed in accordance with Eq. (3) making use of the pieces of envelop information Ia' and Ib', an accurate RF amplitude cannot be obtained.

Next, by referring to FIG. 5, the following description explains a case in which the process of increasing the superposition frequency is carried out in the OPC signal reproduction operation. Since the process of increasing the superposition frequency has been carried out, the OPC superposition frequency fm changed for measurements of measurement quantities is sufficiently higher than the treble cutoff frequency fc of the primary CR analog filter employed in the top-hold/bottom-hold section 9. The measurement quantities include the information on the envelope of the RF signal and the modulation degree of the RF signal. Thus, the primary CR analog filter is capable of sufficiently repressing the high-frequency signal components.

FIG. 5 is a diagram showing the waveform of a model of an RF signal with repressed high-frequency signal components. As shown in FIG. 5, high-frequency signal components are eliminated from the RF signal in a filtering process. Errors Ia' and Ib' caused by the high-frequency signal components are thus repressed. By repressing the high-frequency signal components, the modulation degree M computed in accordance with Eq. (1) can be brought to a value close to the modulation degree M of an ideal RF signal. By the same token, by repressing the high-frequency signal components, the $\beta$ value computed in accordance with Eq. (2) can be brought to a value close to the $\beta$ value of an ideal RF signal. In the same way, by repressing the high-frequency signal components, the RF amplitude computed in accordance with Eq. (3) can be brought to a value close to the RF amplitude of an ideal RF signal.

It is to be noted that, if the frequency of the high-frequency signal is changed from a value close to 300 MHz to a value close to 500 MHz as described above, the RIN value representing a noise characteristic of the laser beam increases by a little bit. In a measurement carried out by the information measurement system for measuring the modulation degree, the measured modulation degree is affected significantly by, among other factors, noises of the disc and characteristic variations on the surface of the disc. Since the RIN is stable for white noises, for example, in an area having no recorded signal, effects on top and bottom hold values are measured in advance and, in the actual measurement, the measured effects are subtracted from the measured modulation degree so that the effects of the noises of the disc and characteristic variations on the surface of the disc can be eliminated with ease. Thus, there are no big effects.

As described above, the superposition frequency fm for the OPC signal reproduction operation carried out to measure information on the amplitude of the RF signal is increased to a value higher than the superposition frequency fr for the regular signal reproduction operation. Thus, the effect of the high-frequency signal components left in the RF signal can be reduced. Since only the superposition frequency is changed, a high-order FIR filter is not required in the information measurement system including the top-hold/bottom-hold section 9. Thus, this configuration offers merits that the configuration is capable of preventing the information processing apparatus from becoming complicated and, hence, preventing a problem from being raised in the cost aspect.

Modifications

An embodiment has been described concretely so far. It is needless to say, however, that a variety of changes can be made to, among others, the configuration of the information processing apparatus and the processing carried out by the information processing apparatus. Modifications of the embodiment are described as follows.

In the embodiment described above, the process of measuring the information on the envelope of the RF signal and the process of measuring the modulation degree, the $\beta$ value and the RF amplitude on the basis of the information on the envelope of the RF signal are carried out in the OPC signal reproduction operation. However, the process of measuring the information on the envelope of the RF signal and the process of measuring the modulation degree, the $\beta$ value and the RF amplitude on the basis of the information on the envelope of the RF signal can also be carried out in other processing. For example, process of measuring the information on the envelope of the RF signal and the process of measuring the modulation degree, the $\beta$ value and the RF amplitude on the basis of the information on the envelope of the RF signal can be carried out in processing to correct optical aberrations.

In addition, as an example, the embodiment described above implements an information processing apparatus having a function to record a signal onto a disc and reproduce the signal from the disc. However, the embodiment can also implement an apparatus having only the reproduction function or a disc drive apparatus. In a player serving as a reproduction apparatus for reproducing an RF signal from a ROM (Read Only Memory) disc for example, in order to correct optical aberrations, information on the envelope of the RF signal is measured and, then, the modulation degree, the $\beta$ value and the RF amplitude are computed on the basis of the information on the envelope of the RF signal. In a reproduction operation to reproduce an RF signal used for correcting optical aberrations, processing can be carried out to increase the superposition frequency to a value higher than that used for the regular signal reproduction operation.

In the embodiment described above, the OPC is carried out prior to a signal recording operation. However, implementations of the present disclosure are by no means limited to this embodiment. For example, the OPC can also be carried out intermittently while a regular signal recording operation is being performed. The OPC carried out intermittently while a regular signal recording operation is being performed is referred to as a running calibration. That is to say, after a portion of a signal to be recorded has been recorded onto the optical disc 1, the signal recording operation is suspended temporarily and the already recorded signal portion is reproduced in order to carry out the OPC as an OPC signal reproduction operation. After the OPC signal reproduction operation has been completed, the suspended signal recording operation is resumed. In the execution of the OPC signal reproduction operation, processing can be carried out to increase the superposition frequency to a value higher than that used for the regular signal reproduction operation. Thus, the OPC can be carried out either prior to a regular signal recording operation or intermittently while a regular signal recording operation is being performed.

The concrete numerical values of the treble cutoff frequency and the superposition frequency in the embodiment described above are typical values and, therefore, the treble cutoff frequency and the superposition frequency are by no means limited to these typical values. For example, for every laser beam having its peculiar wavelength, the superposition frequency of the regular signal reproduction operation and the superposition frequency of the OPC signal reproduction operation carried out to measure information on the amplitude of the RF signal are each set at a proper value.

In the embodiment described above, the modulation degree, the β value and the information on the amplitude of the RF signal are measured. However, quantities to be measured are by no means limited to the modulation degree, the β value and the information on the amplitude of the RF signal. In addition, in a process of measuring another measurement value by making use of the information on the amplitude of the RF signal, processing can be carried out to increase the superposition frequency to a value higher than that used for the regular signal reproduction operation.

In the embodiment and every modified version which are described so far, the RF signal supplied from the optical pickup 2 to the top-hold/bottom-hold section 9 can be reproduced at a multiple-time reproduction speed. The multiple-time reproduction speed is a reproduction speed equal to N times the normal reproduction speed where symbol N denotes a number greater than 1 (that is, N>1). For example, the highest frequency of the RF signal reproduced at a 4-time reproduction speed approaches the pre-increase superposition frequency which is the superposition frequency of the regular signal reproduction operation. It is thus difficult to remove high-frequency signal components from the RF signal rigorously by making use of the primary CR analog filter. In the case of this embodiment, however, the superposition frequency is increased to a value higher than the superposition frequency of the regular signal reproduction operation. It is thus possible to remove high-frequency signal components from the RF signal in a filtering process carried out by making use of the primary CR analog filter. In this way, also in the case of an RF signal reproduced at a multiple-time reproduction speed, the same effects can be obtained.

The configuration of the information processing apparatus according to the embodiment or any of the modified version and the effects of the apparatus can be realized in an information processing method provided for the apparatus, an information processing program implementing the method and a recording medium used for storing the program in addition to the apparatus itself.

The present disclosure contains subject matter related to that disclosed in Japanese Priority Patent Application JP 2010-192789 filed in the Japan Patent Office on Aug. 30, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
    a signal reproduction section configured to obtain a reproduced signal from a recording medium by radiating a laser beam emitted by a laser-beam source to said recording medium; and
    a high-frequency signal superposition section configured to superpose either a first high-frequency signal or a second high-frequency signal having a frequency higher than the frequency of said first high-frequency signal on a driving signal used for driving said laser-beam source,
    wherein, in a first signal reproduction operation, said high-frequency signal superposition section superposes said first high-frequency signal on said driving signal whereas, in a second signal reproduction operation to measure information on the amplitude of said reproduced signal, said high-frequency signal superposition section superposes said second high-frequency signal on said driving signal.

2. The information processing apparatus according to claim 1, further comprising
    a signal recording section configured to record a signal onto said recording medium by radiating said laser beam to said recording medium,
    wherein said information on the amplitude of said reproduced signal is measured in order to optimize the recording power of said laser beam radiated in a signal recording operation.

3. The information processing apparatus according to claim 2, wherein said information on the amplitude of said reproduced signal is measured either before said signal recording section carries out said signal recording operation or while said signal recording section is carrying out said signal recording operation.

4. The information processing apparatus according to claim 1, wherein said reproduced signal is a signal reproduced from said recording medium at an N-time speed where symbol N denotes a number greater than 1, that is, N>1.

5. The information processing apparatus according to claim 1, wherein:
    said reproduced signal reproduced in said first signal reproduction operation is supplied to a first filter;
    said reproduced signal reproduced in said second signal reproduction operation is supplied to a second filter; and
    the treble cutoff characteristic of said first filter is steeper than the treble cutoff characteristic of said second filter.

6. The information processing apparatus according to claim 5, wherein the frequency of said second high-frequency signal is 2 to 4 times the treble cutoff frequency of said second filter.

7. The information processing apparatus according to claim 5, wherein said first filter is a digital filter whereas said second filter is an analog filter.

8. An information processing method comprising:
    a signal reproduction step of obtaining a reproduced signal from a recording medium by radiating a laser beam emitted by a laser-beam source to said recording medium; and
    a high-frequency signal superposition step of superposing either a first high-frequency signal or a second high-frequency signal having a frequency higher than the frequency of said first high-frequency signal on a driving signal used for driving said laser-beam source,
    wherein, in a first signal reproduction operation, said high-frequency signal superposition step is carried out in order to superpose said first high-frequency signal on said driving signal whereas, in a second signal reproduction operation to measure information on the amplitude of said reproduced signal, said high-frequency signal superposition step is carried out in order to superpose said second high-frequency signal on said driving signal.

* * * * *